United States Patent

Maino et al.

[11] Patent Number: 6,016,994
[45] Date of Patent: Jan. 25, 2000

[54] METHOD OF MONITORING A TRANSMISSION ASSEMBLY OF A VEHICLE EQUIPPED WITH ACCELERATION SENSORS, IN PARTICULAR A HELICOPTER

[75] Inventors: Bruno Maino, Samarate; Alberto Bellazzi, Cameri, both of Italy

[73] Assignee: Finmeccanica S.p.A, Rome, Italy

[21] Appl. No.: 09/110,622

[22] Filed: Jul. 6, 1998

[30] Foreign Application Priority Data

Jul. 4, 1997 [IT] Italy .................................. TO97A0591

[51] Int. Cl.⁷ ..................................................... B64C 11/34
[52] U.S. Cl. .................................. 244/17.13; 244/17.11; 244/60; 244/39
[58] Field of Search ............................. 244/17.13, 17.11, 244/60, 39; 180/337, 338

[56] References Cited

U.S. PATENT DOCUMENTS

| | | | |
|---|---|---|---|
| 3,699,806 | 10/1972 | Weichbrodt | 73/71.4 |
| 5,210,704 | 5/1993 | Husseiny | 364/551.01 |
| 5,365,787 | 11/1994 | Hernandez | 73/660 |
| 5,813,292 | 9/1998 | Kish et al. | 244/60 |

FOREIGN PATENT DOCUMENTS

WO96/05486  2/1996  WIPO.

*Primary Examiner*—J. Woodrow Eldred
*Attorney, Agent, or Firm*—Darby & Darby

[57] ABSTRACT

The monitoring method includes the steps of: acquiring a first signal from an acceleration sensor; calculating a transform in the frequency domain of the first signal to obtain an initial sequence of samples, each of the samples having a respective amplitude and a respective frequency; processing the initial sequence of samples to obtain a final sequence of samples; calculating a sixth-order moment of the final sequence of samples; and comparing the sixth-order moment with at least one predetermined threshold to detect any vibrational irregularity in the helicopter transmission assembly.

15 Claims, 6 Drawing Sheets

METHOD OF MONITORING A TRANSMISSION ASSEMBLY OF A VEHICLE EQUIPPED WITH ACCELERATION SENSORS, IN PARTICULAR A HELICOPTER

BACKGROUND OF THE INVENTION

The present invention relates to a method of monitoring a transmission assembly of a vehicle equipped with acceleration sensors, in particular a helicopter.

As is known, helicopter transmission members must be monitored continuously to immediately detect any faults or incipient malfunction conditions, and so prevent failure during flight.

For this purpose, the transmission is equipped with acceleration sensors, the signals of which are processed to determine any faults on the transmission. The methods currently used, however, to process the fault detection sensor signals are not sensitive enough to ensure fault detection well in advance of catastrophic failure.

SUMMARY OF THE INVENTION

It is an object of the present invention to provide a monitoring method ensuring reliable, advance detection of any faults or malfunction conditions which might result in failure.

According to the present invention, there is provided a method of monitoring a transmission assembly of a vehicle equipped with acceleration sensors, in particular a helicopter, characterized by comprising the steps of:

acquiring a first signal from an acceleration sensor;

calculating a transform in the frequency domain of said first signal to obtain an initial sequence of samples, each of said samples having a respective amplitude and a respective frequency;

processing said initial sequence of samples to obtain a final sequence of samples;

calculating a sixth-order moment of said final sequence of samples; and comparing said sixth-order moment with at least a first predetermined threshold.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
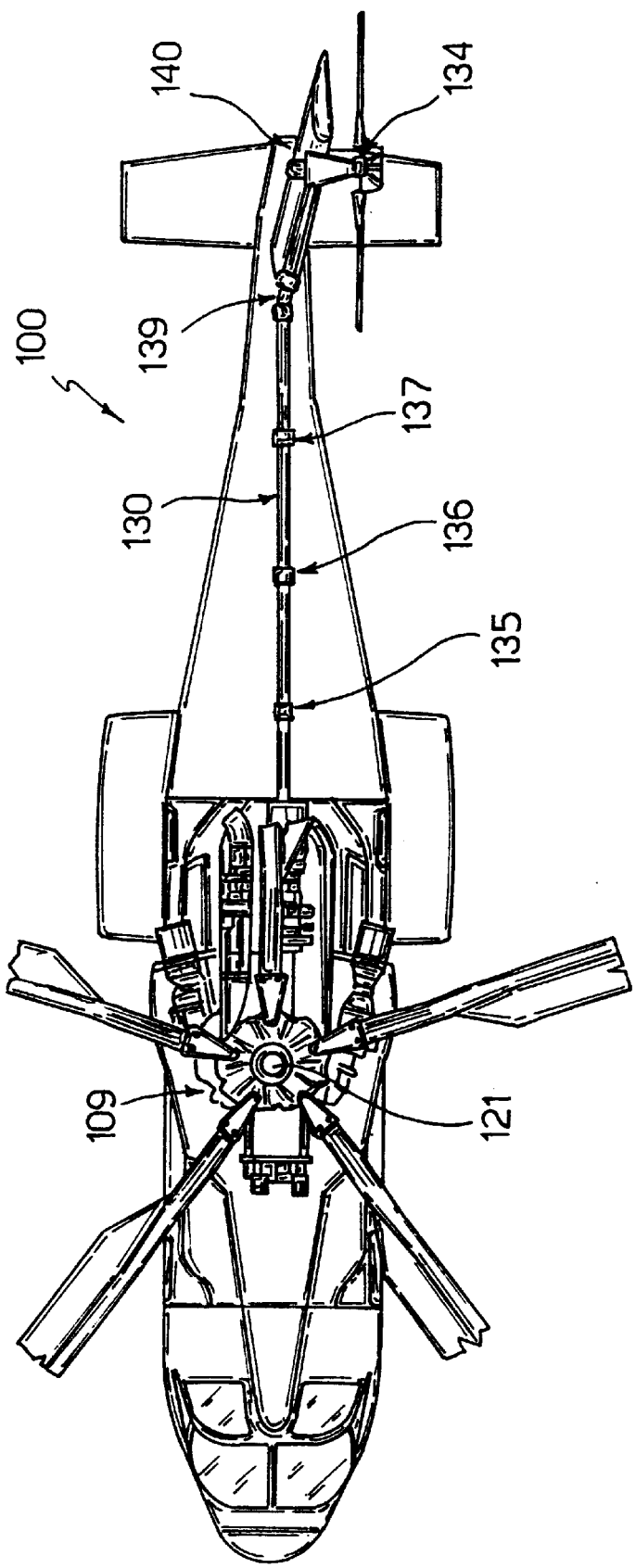
FIG. 1 shows a top plan view of a helicopter, in which the helicopter transmission is shown schematically.
Figure 2:
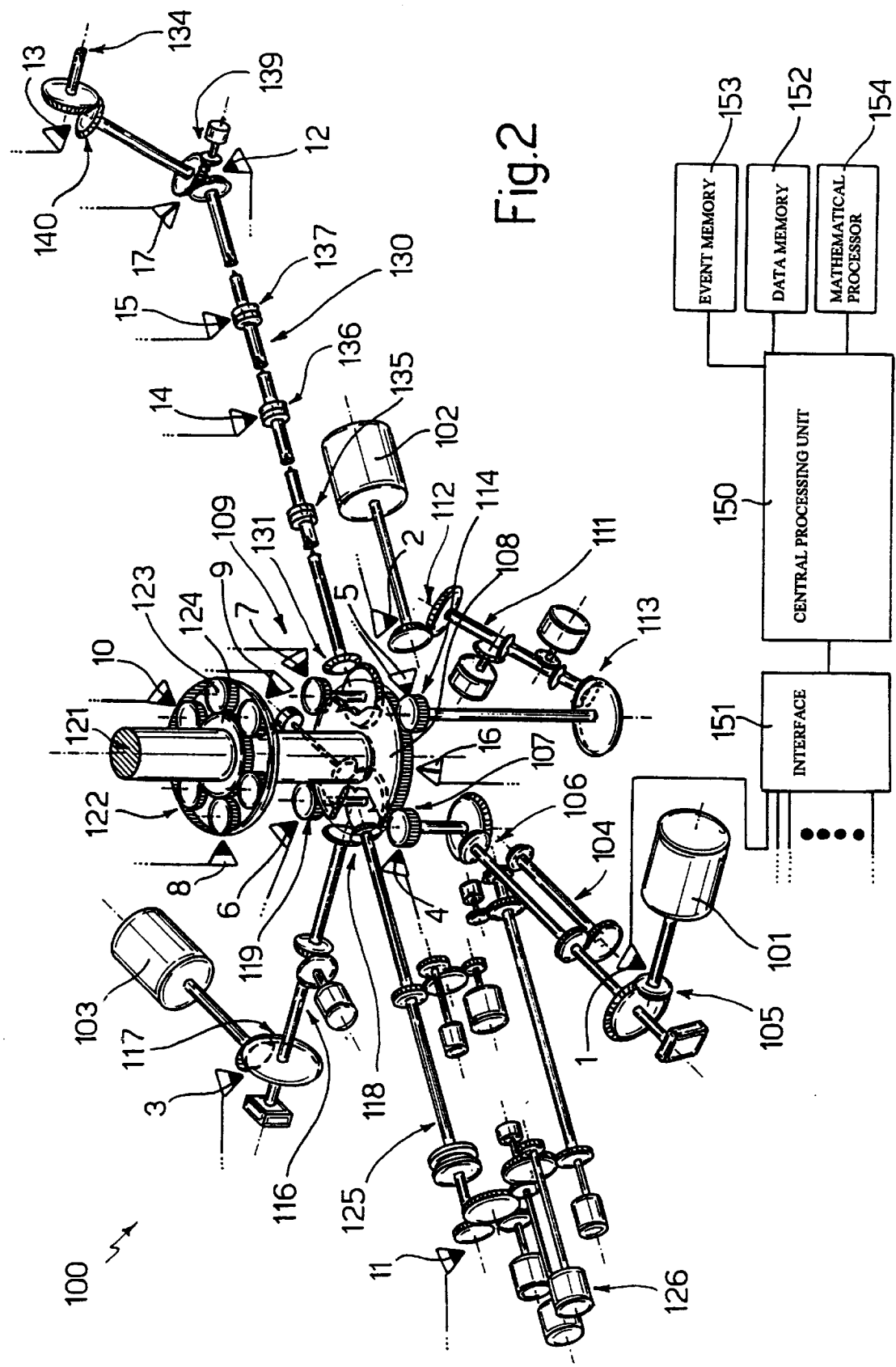
FIG. 2 shows a simplified diagram of the helicopter transmission and the location of various transmission member sensors.

FIGS. 1 and 2 show, schematically, the members of a helicopter 100 pertinent to the present invention.

In particular, helicopter 100 comprises a first engine 101, a second engine 102, and a third engine 103; first engine 101 is connected, by means of a first transmission line 104 comprising a first, second and third reducer 105–107, to an input gear 108 of a main gear assembly 109; second engine 102 is connected to input gear 108 by means of a second transmission line 111 comprising a fourth, fifth and sixth reducer 112–114; and third engine 103 is connected to input gear 108 by means of a third transmission line 116 comprising a seventh, eighth and ninth reducer 117–119.

Input gear 108 is connected to a rotor 121 of helicopter 100 by means of an epicyclic reducer 122 forming part of main gear assembly 109 and comprising six planet gears 123 and a sun gear 124; and input gear 108 is also connected—by means of a fourth transmission line 125 also connected to first transmission line 104—to an accessory box indicated schematically by 126, and to a fifth transmission line 130 connected to a tail rotor 134 and comprising a power take-off gear 131, intermediate joints 135–137, an intermediate gearbox 139, and a tail gearbox 140.

FIG. 2 shows fifteen acceleration sensors 1–15 and two azimuth sensors 16, 17 fitted close to the reduction stages as indicated in Table I below.

TABLE I

| Sensor | Pos. |
|---|---|
| 1 | 105 |
| 2 | 112 |
| 3 | 117 |
| 4 | 107 |
| 5 | 114 |
| 6 | 119 |
| 7 | 131 |
| 8 | 122 (front) |
| 9 | 122 (right) |
| 10 | 122 (left) |
| 11 | 126 |
| 12 | 139 |
| 13 | 140 |
| 14 | 136 |
| 15 | 137 |
| 16 | 108 |
| 17 | 139 |

Helicopter 100 also comprises a data processing unit 150 connected to sensors 1–17 by an interface unit 151 for sampling and digitizing the sensor signals, and to a data memory 152, an event memory 153, and a mathematical processor 154.

The monitoring method described below provides for improving the "visibility" of vibrational irregularities, and may be used to advantage for detecting problems arising on the external and internal shafts on the basis of signals supplied by acceleration sensors 1–10 and 12, 13.

The monitoring method provides for processing a signal s(t), supplied by whichever of acceleration sensors 1–10 or 12, 13 is considered in each case, using a signal s1(t) supplied by the azimuth sensor on a shaft connected to the reducer monitored by the sensor in question (azimuth sensor 16 for acceleration sensors 1–10, and azimuth sensor 17 for acceleration sensors 12, 13). Signal s(t) is a vibratory signal (related to the rotation frequency of the shaft associated with the sensor in question) and is affected by random noise as well as by noise related to other nearby rotary members.

Figure 3:
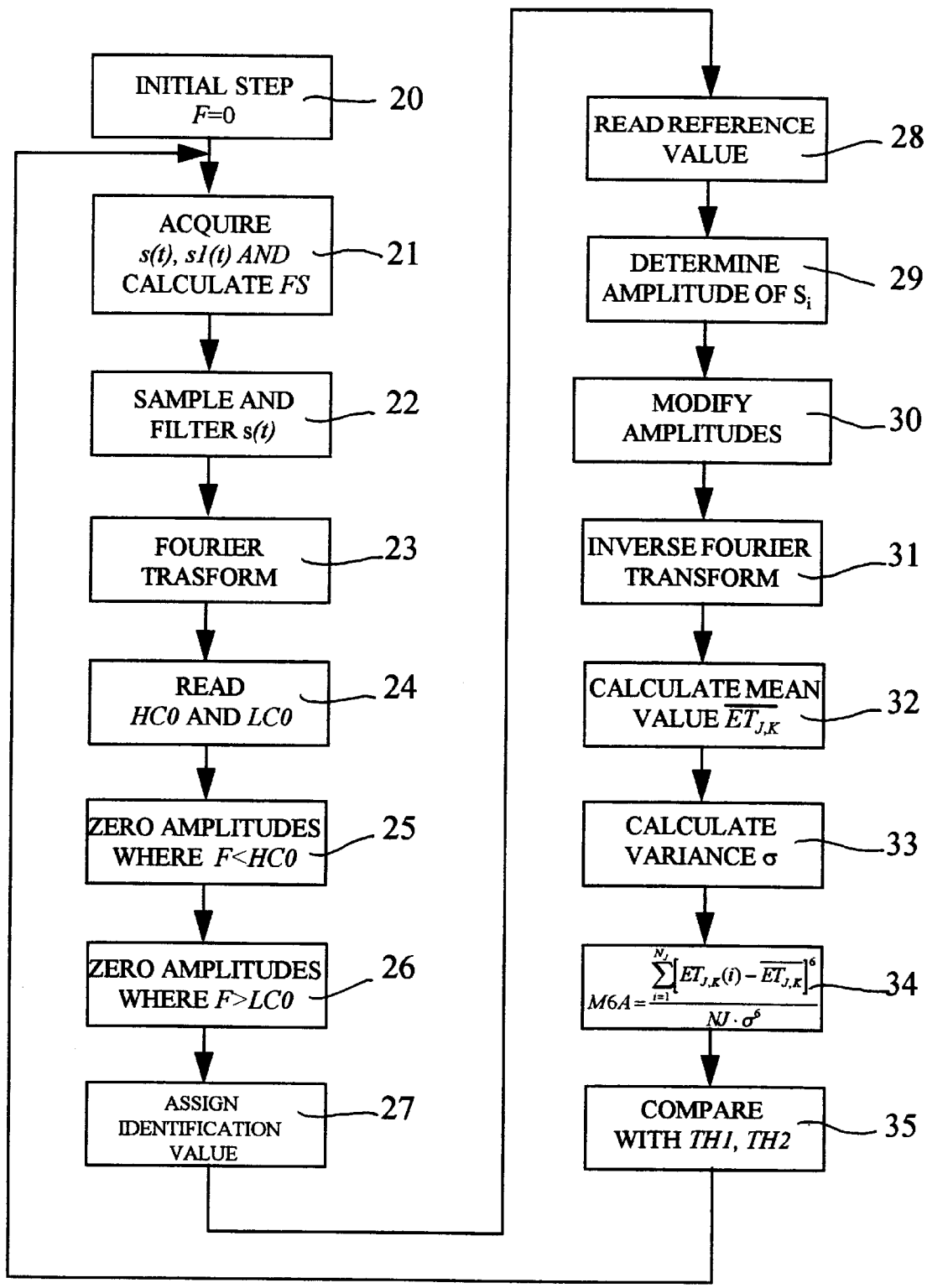
FIGS. 3–5 show flow charts of steps in the method according to the invention.

More specifically, and with reference to FIG. 3, the method comprises an initial step, in which a variable F (explained later on with reference to FIG. 5) is set to a first predetermined value, e.g. 0 (block 20).

Signal s(t) and signal s1(t) are then acquired (block 21), and a sampling frequency FS is calculated by multiplying the frequency of azimuth sensor signal s1(t) by a memorized coefficient KT equal to the ratio between two prime whole numbers, and in particular correlated to the transmission ratio between the azimuth sensor shaft and the shaft monitored by the sensor in question, so that the resulting sampling frequency FS is correlated to the azimuth sensor frequency, and is such as to supply exactly NJ points (where NJ is a power of 2) of signal s(t) for each revolution of the monitored shaft.

Signal s(t) is then sampled and filtered by interface unit 151 to remove the random noise and nonsynchronous periodic components (block 22) and obtain a filtered signal $T_{1m}(i)$ defined by a number of samples. Signal s(t) is preferably sampled and filtered using the sequence of steps shown in FIG. 4 and described in detail later on.

Figure 6:
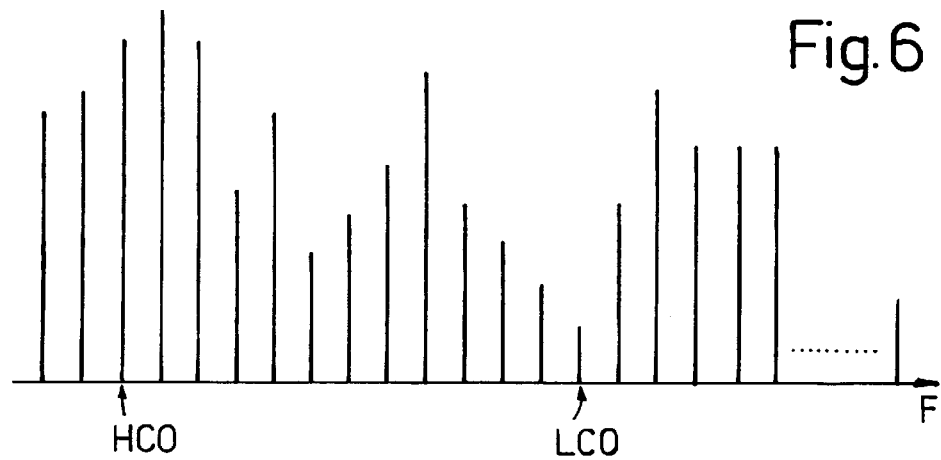
FIGS. 6–8 show frequency spectra relative to the method according to the present invention.

The fast Fourier transform (FFT) F(k) of filtered signal $T_{1m}(i)$ is then calculated (block 23), preferably using mathematical processor 154. Transform F(k) gives the frequency spectrum of filtered signal $T_{1m}(i)$ shown in FIG. 6, and which defines an initial sequence of samples $S_1$ (spectral components of filtered signal $T_{1m}(i)$, each having a respective frequency and a respective amplitude; and the amplitude of each sample is expressed in Cartesian representation, i.e. by a complex number having a real part and an imaginary part.

A first and a second reference frequency HC0, LC0—where HC0<LC0—specific to the shaft of helicopter 100 connected to the reducer monitored by the sensor in question, are then read in data memory 152 (block 24).

The pair of frequencies HC0, LC0, together with all the other pairs specific to the other shafts of helicopter 100, is contained in a table memorized in data memory 152.

Figure 7:
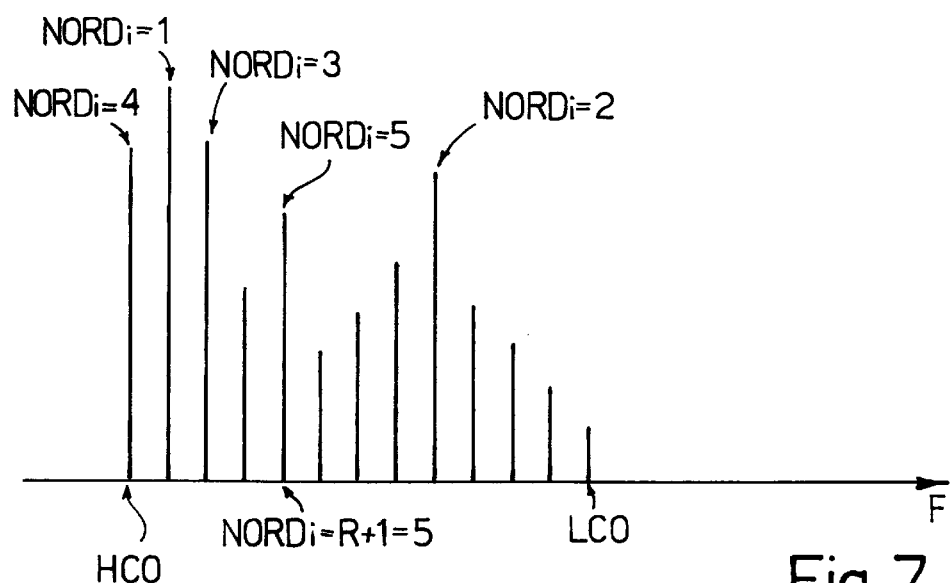

The amplitudes of the samples, in the initial sequence of samples $S_1$, of a frequency below first reference frequency HC0 are then zeroed (block 25), and the amplitudes of the samples of a frequency above second reference frequency LC0 are zeroed (block 26) to obtain an intermediate sequence of samples $S_2$ as shown in FIG. 7.

As shown in FIG. 7, each sample in the intermediate sequence of samples $S_2$ is then assigned a respective identification value NORDi according to a rule of assignment whereby the samples are numbered in order of decreasing amplitude (i.e. working from the highest- to the lowest-amplitude sample) and, starting from the highest-amplitude sample, are assigned respective whole identification values NORDI increasing from value 1 (block 27).

A reference value R assigned to the first and second reference frequency HC0, LC0 read in block 24 is then read in data memory 152 (block 28).

The amplitude of the specific sample $S_i$, in the intermediate sequence of samples $S_2$, having an identification value NORDI equal to reference value R increased by one unit (i.e. NORDi=R+1) is then determined (block 29).

Figure 8:
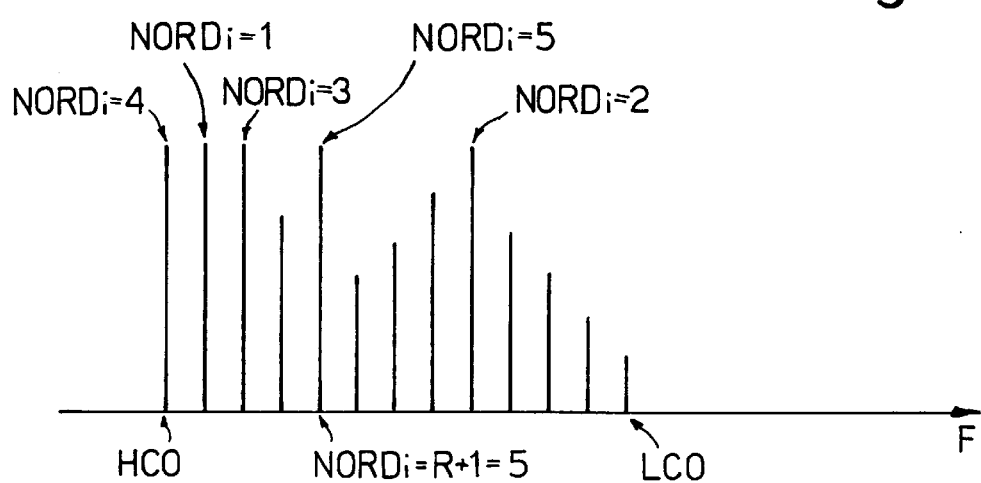

The amplitudes of the samples, in the intermediate sequence of samples $S_2$, having identification values NORDi below reference value R increased by one unit (i.e. NORDi<R+1) and therefore, according to said rule of assignment, of a higher amplitude than sample $S_i$, are then modified. More specifically, the amplitudes of said samples are modified (block 30) by equalling them to the amplitude of sample $S_i$ determined above, to obtain a final sequence of samples $S_3$ defining a modified frequency spectrum as shown in FIG. 8. The FIG. 8 spectrum is obtain when reference value R equals 4, so that the amplitudes of the samples having NORDi=1,2,3,4 are equalled to the amplitude of sample $S_i$ having NORDi equal to 5.

The amplitudes of said samples must be modified without altering their phase, which is done either by reducing by equal percentage amounts the real part and imaginary part of each of the complex numbers representing the samples, or by expressing the samples in a polar representation by means of two-dimensional vectors, each defined by the absolute value (amplitude) and the phase of the sample, and so reducing only the absolute value of each vector.

The inverse fast Fourier transform (IFFT) of the modified spectrum is then calculated, preferably using mathematical processor 154, to obtain a modified signal $ET_{J,K}(i)$ defined by a number of samples (block 31).

The mean value $\overline{ET_{J,K}}$ (block 32) and the standard deviation $\sigma$ (block 33) of modified signal $ET_{J,K}(i)$ are then calculated.

The sixth-order moment M6A of modified signal $ET_{J,K}(i)$ is then calculated (block 34) according to the equation:

$$M6A = \frac{\sum_{i=1}^{NJ} [ET_{J,K}(i) - \overline{ET_{J,K}}]^6}{NJ \cdot \sigma^6}$$

where NJ is the number of samples of modified signal $ET_{J,K}(i)$.

The sixth-order moment M6A of modified signal $ET_{J,K}(i)$ is used to indicate dispersion about the mean value of the values assumed by the signal. More specifically, the sixth-order moment assigns more weight to the points furthest from the mean value than does the second-order moment (variance), and is therefore particularly useful for detecting defects in a gear, e.g. cracks in the gear teeth, by assigning greater weight to local defects. In which case, in fact, the respective sensor generates high-amplitude but fairly short pulses, and calculating a sixth-order moment provides for significantly identifying the contribution of the pulses.

Figure 5:
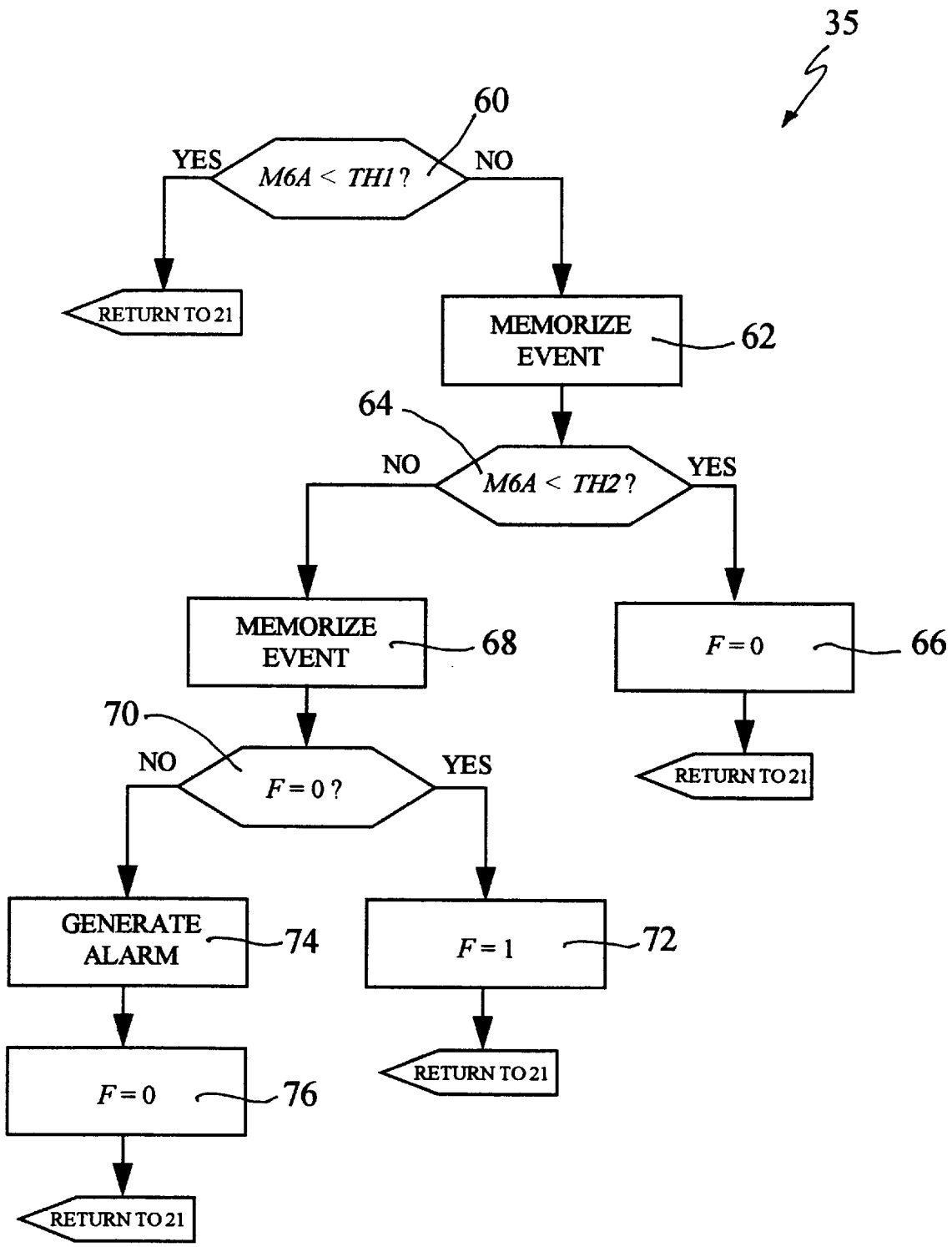

Central processing unit 150 then compares sixth-order moment M6A with two threshold values TH1, TH2 (where $TH1<TH_2$) to generate, if necessary, alarm signals (block 35) according to the procedure described in detail later on with reference to FIG. 5; and block 35 then goes back to block 21 to continue monitoring with the next portion of signal s(t).

Figure 4:
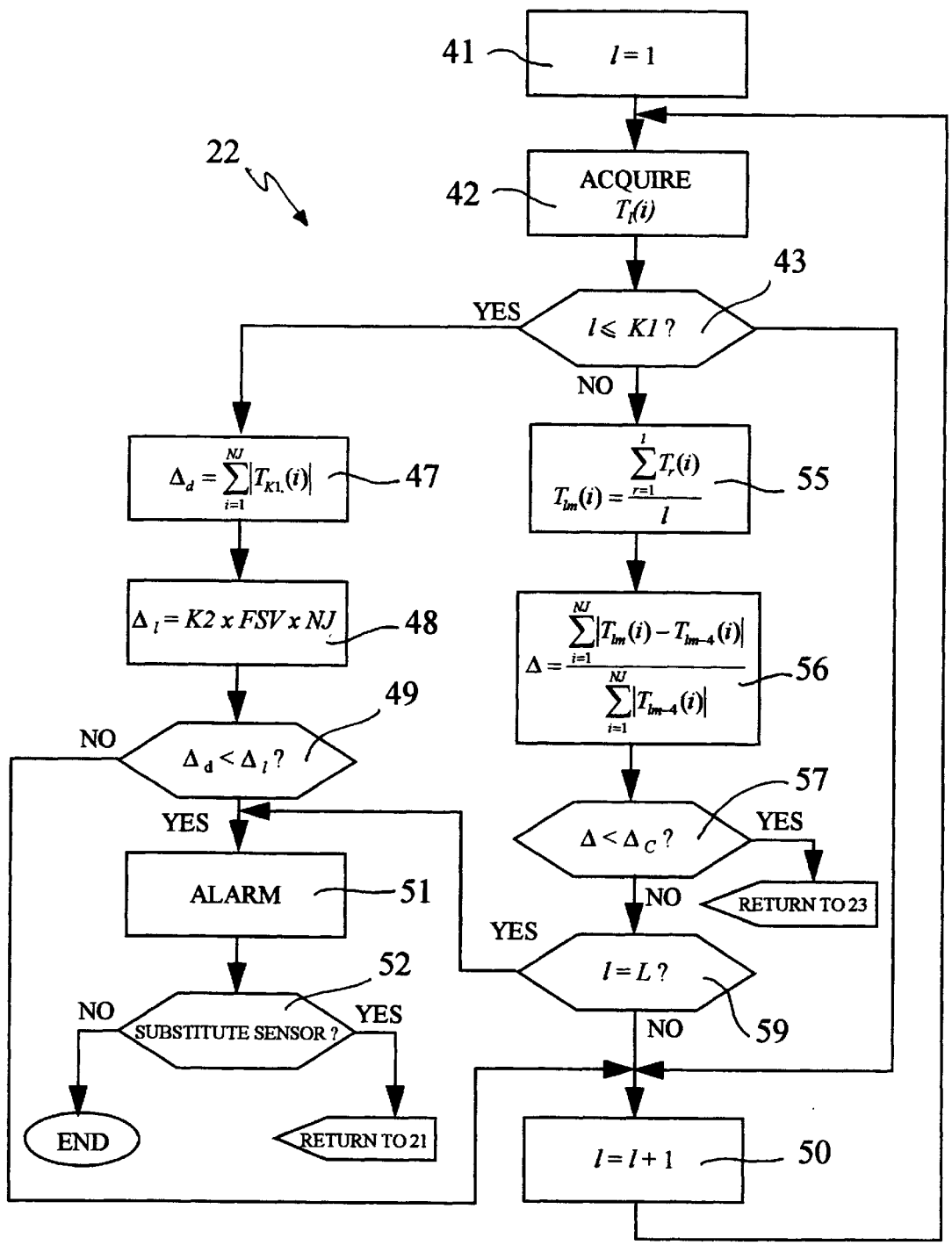

Sampling and filtering in block 22 are conveniently performed using the method described below with reference to FIG. 4.

To begin with, a revolution counter 1 is set to 1 (block 41); signal s(t) is sampled at frequency FS to obtain NJ points or samples $T_1(i)$ representing a synchronous vibratory time series relative to the sensor in question, to the respective shaft, and to each 1-th revolution (block 42); the value of counter 1, in particular whether it is less than or equal to a predetermined value K1, is determined (block 43); and, if counter 1 is less than or equal to K1 (performance of fewer than K1 iterations corresponding to the revolutions of the monitored shaft—YES output of block 43), the availability of the signal is determined by calculating (block 47) the sum $\Delta_d$ of the samples acquired at the 1-th revolution, according to the equation:

$$\Delta_d = \sum_{i=1}^{NJ} |T_{KI}(i)|$$

A limit value $\Delta_1$ is then calculated (block 48) according to the equation:

$\Delta_1 = K2 \times FSV \times NJ$ where FSV is the bottom-scale value, and K2 a predetermined constant much lower than 1; and a check is made (block 49) to determine whether the calculated sum $\Delta_d$ is less than the limit value $\Delta_1$. In the event of a negative response (NO output of block 49), the signal is considered to exist, counter 1 is increased (block 50), and block 50 goes back to block 42 to acquire further NJ points relative to the next revolution. Conversely (YES output of block 49), the signal is considered nonexistent and an alarm signal is generated (block 51); a check is made (block 52) to determine the presence of a substitute sensor (e.g. sensor 6 for sensors 4 and 5); in the event of a positive response (YES output of block 52), block 52 goes back to block 21 in FIG. 3 to repeat the procedure on the substitute sensor; and, in the absence of a substitute sensor, or if convergence is not reached even with the substitute sensor (NO output of block 52), the procedure is interrupted.

Conversely, if counter 1 is greater than K1 (performance of more than K1 iterations corresponding to the revolutions of the monitored shaft—NO output of block 43), block 43 goes on to a block 55, which calculates the average contiguous synchronous time series $T_{1m}(i)$ defining the filtered signal calculated in block 22, according to the equation:

$$T_{lm}(i) = \frac{\sum_{r=1}^{l} T_r(i)}{l} \quad i = 1...NJ$$

i.e. the mean value of each sample $T_1(i)$ over the 1 revolutions considered is calculated.

Convergence of the averaging process is then determined by calculating a convergence value $\Delta$ given by the sum, over all the samples, of the absolute value of the difference between the actual mean value of each sample and the mean value calculated in a previous revolution (at distance 4) divided by the sum of the mean samples in the previous revolution considered (at distance 4), according to the equation:

$$\Delta = \frac{\sum_{i=1}^{NJ} |T_{lm}(i) - T_{lm-4}(i)|}{\sum_{i=1}^{NJ} |T_{lm-4}(i)|}$$

where $T_{1m}(i)$ represents the i-th sample of the 1-th iteration, and $T_{1m-4}(i)$ represents the i-th sample of the 1-4-th iteration (block 56).

A check is then made to determine whether the calculated convergence value is less than or equal to a predetermined permissible minimum convergence value Ac (block 57). In the event of a positive response (YES output), the convergence process is interrupted, and block 57 goes back to the main program (block 23 in FIG. 3). Conversely, a check is made to determine whether the averaging process has already been performed a predetermined maximum number of times L (block 59). If the iteration (revolution) counter 1 is less than L (NO output), the counter is increased (block 50) and the operations described above are repeated. Conversely (YES output), the procedure for generating an alarm signal and possibly repeating the procedure with a substitute sensor, as described with reference to blocks 51–52, is repeated.

The threshold comparison and alarm generating step in block 35 of FIG. 3 is conveniently performed as described below with reference to FIG. 5.

To begin with, sixth-order moment M6A is compared with first threshold TH1 (block 60); if M6A<TH1 (YES output), block 60 goes back to block 21 in FIG. 3 to continue monitoring with the next group of samples; conversely, if threshold TH1 has been exceeded (NO output of block 60), the event is memorized in event memory 153 (block 62) and M6A is compared with second threshold TH2 (block 64). If M6A<TH2 (YES output of block 64), variable F (initialized in block 20 of FIG. 3 to memorize whether threshold TH2 has already been exceeded) is set to (or confirmed at) the first predetermined value (0 in the example shown) (block 66), and block 66 goes back to block 21 of FIG. 3 to continue monitoring with the next group of samples. Conversely (NO output of block 64), the event is memorized in event memory 153 (block 68) and the value of variable F is determined (block 70). In particular, if variable F is at the first predetermined value (YES output), F is set to a second predetermined value, e.g. 1, (block 72), and block 72 goes back to block 21 of FIG. 3 to continue monitoring with the next group of samples. Conversely, if variable F is at the second predetermined value, i.e. threshold TH2 has already been exceeded (NO output of block 70), a pilot alarm signal is generated (block 74), variable F is again set to the first predetermined value (block 76), and block 76 goes back to block 21 of FIG. 3 to continue monitoring with the next samples.

The advantages of the method described are as follows. In particular, calculating sixth-order moment M6A provides for diagnosing local defects, e.g. cracks in severely stressed parts of helicopter 100, which may sooner or later result in failure of the part.

Moreover, the method provides for distinguishing useful monitoring components from random noise and noise generated by other nearby moving members.

Clearly, changes may be made to the method as described and illustrated herein without, however, departing from the scope of the present invention. In particular, the filtering and averaging procedure and the alarm generating procedure may differ from those described.

We claim:

1. A method of monitoring a transmission assembly of a vehicle equipped with acceleration sensors, comprising the steps of:

acquiring a signal from an acceleration sensor mounted on the transmission assembly for detecting the acceleration of a moving member of the transmission assembly;

calculating a transform in the frequency domain of said signal to obtain a sequence of samples, each of said samples having a respective amplitude and a respective frequency;

processing said initial sequence of samples to obtain a final sequence of samples;

calculating a sixth-order moment of said final sequence of samples;

comparing said sixth-order moment with at least a first predetermined threshold; and generating an alarm signal if said sixth-order moment exceeds said at least a first predetermined threshold.

2. A method as claimed in claim 1, characterized in that said transform is a Fourier transform.

3. A method as claimed in claim 1, characterized in that said step of processing said initial sequence of samples comprises the steps of:

acquiring a first and a second reference frequency (HC0, LC0);

modifying the amplitudes of first samples, in said initial sequence of samples ($S_1$), having frequencies with a first predetermined relationship with said first and second reference frequencies (HC0, LC0), to obtain an intermediate sequence of samples ($S_2$);

assigning each sample in said intermediate sequence of samples ($S_2$) a respective identification value (NORDi) according to a predetermined rule of assignment;

acquiring a reference value (R); and modifying the amplitudes of second samples, in said intermediate sequence of samples ($S_2$), having identification values (NORDi) with a second predetermined relationship with said reference value (R), to obtain said final sequence of samples ($S_3$).

4. A method as claimed in claim 3, characterized in that said step of modifying the amplitudes of first samples in said initial sequence of samples ($S_1$) comprises the steps of:

zeroing the amplitudes of the samples, in said initial sequence of samples ($S_1$), having frequencies lower than said first reference frequency (HC0); and zeroing the amplitudes of the samples, in said initial sequence of samples ($S_1$), having frequencies higher than said second reference frequency (LC0).

5. A method as claimed in claim 3, characterized in that said assigning step comprises the step of:

identifying said samples in said intermediate sequence of samples ($S_2$) in order of decreasing amplitude, wherein said identification values (NORDi) are whole numbers, and, commencing with the highest-amplitude sample, said samples in said intermediate sequence of samples ($S_2$) are assigned respective said identification values (NORDi) increasing in value from a predetermined value.

6. A method as claimed in claim 3, characterized in that said step of modifying the amplitudes of second samples in said intermediate sequence of samples ($S_2$) comprises the steps of:

determining the amplitude of a reference sample, in said intermediate sequence of samples ($S_2$), having an identification value (NORDi) with a third predetermined relationship with said reference value (R); and altering the amplitudes of said second samples in said intermediate sequence of samples ($S_2$) on the basis of said amplitude of said reference sample.

7. A method as claimed in claim 6, characterized in that said step of determining the amplitude of a reference sample in said intermediate sequence of samples ($S_2$) comprises the step of:

determining said reference sample, in said intermediate sequence of samples ($S_2$), having an identification value (NORDi) equal to said reference value (R) increased by a predetermined quantity.

8. A method as claimed in claim 6, characterized in that said second samples in said intermediate sequence of samples ($S_2$) have respective identification values (NORDi) lower than the identification value (NORDi) of said reference sample; and in that said step of altering the amplitudes of said second samples in said intermediate sequence of samples ($S_2$) comprises the step of:

equalling the amplitudes of said second samples to the amplitude of said reference sample to obtain said final sequence of samples ($S_3$).

9. A method as claimed in claim 1, characterized in that said step of calculating a sixth-order moment (M6A) comprises the steps of:

calculating an inverse transform in the time domain of said final sequence of samples to obtain a second signal ($ET_{J,K}(i)$) defined by a number (NJ) of samples;

calculating the mean value ($\overline{ET_{J,K}(i)}$) of said second signal ($ET_{J,K}(i)$);

calculating the standard deviation ($\sigma$) of said second signal ($ET_{J,K}(i)$) and calculating said sixth-order moment (M6A) according to the equation:

$$M6A = \frac{\sum_{i=1}^{NJ}[ET_{J,K}(i) - \overline{ET_{J,K}(i)}]^6}{NJ \cdot \sigma^6}$$

where M6A is said sixth-order moment, $ET_{J,K}(i)$ is said second signal, NJ is said number of samples of said second signal $ET_{J,K}(i)$, $\overline{ET_{J,K}(i)}$ is said mean value of said second signal $ET_{J,K}(i)$, and $\sigma$ is said standard deviation of said second signal $ET_{J,K}(i)$.

10. A method as claimed in claim 9, characterized in that said inverse transform is an inverse Fourier transform.

11. A method as claimed in claim 1, characterized in that said step of calculating a transform is preceded by a step of sampling and filtering said signal.

12. A method as claimed in claim 11, characterized in that said step of sampling and filtering comprises the steps of:

acquiring a number of synchronous samples $T_1(i)$ for each revolution of a shaft associated with said acceleration sensor; and calculating an average time series $T_{1m}(i)$ according to the equation:

$$T_{bn}(i) = \frac{\sum_{r=1}^{l} T_r(i)}{l} \quad i = 1...NJ$$

where $T_1(i)$ is said synchronous samples, and l is a counter for counting the number of revolutions of said shaft.

13. A method as claimed in claim 12, characterized in that said step of calculating an average time series is preceded by a step of determining the presence of significant signal values.

14. A method as claimed in claim 12, characterized in that said step of calculating an average time series is followed by a step of determining convergence of said average time series.

15. A method as claimed in claim 1, characterized in that said step of comparing said sixth-order moment (M6A) also comprises the step of comparing said sixth-order moment (M66A) with a second threshold.

* * * * *